(12) United States Patent
Yoshimatsu (10) Patent No.: US 7,714,471 B2
(45) Date of Patent: May 11, 2010

(54) MAGNETIZING METHOD, AND MOTOR AND METHOD OF MANUFACTURING MOTOR

(75) Inventor: Futoshi Yoshimatsu, Shizuoka-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 379 days.

(21) Appl. No.: 11/785,502

(22) Filed: Apr. 18, 2007

(65) Prior Publication Data

US 2008/0164776 A1 Jul. 10, 2008

(30) Foreign Application Priority Data

Apr. 26, 2006 (JP) ............................. 2006-121726
Mar. 16, 2007 (JP) ............................. 2007-068645

(51) Int. Cl.
*H02K 7/09* (2006.01)

(52) U.S. Cl. ................. 310/90.5; 310/67 R; 310/156.43

(58) Field of Classification Search ................... 310/51, 310/90.5, 67 R, 156.43–156.45
See application file for complete search history.

(56) References Cited

U.S. PATENT DOCUMENTS

| | | | | |
|---|---|---|---|---|
| 3,845,997 A | * | 11/1974 | Boden et al. ............... | 310/90.5 |
| 5,942,873 A | * | 8/1999 | Nakano ....................... | 318/702 |
| 6,509,664 B2 | * | 1/2003 | Shah et al. ................... | 310/181 |
| 7,417,346 B2 | * | 8/2008 | Matsunobu et al. .... | 310/156.45 |
| 2001/0030471 A1 | * | 10/2001 | Kanebako ..................... | 310/12 |
| 2005/0275301 A1 | * | 12/2005 | Moriya et al. ........... | 310/156.45 |
| 2006/0273674 A1 | * | 12/2006 | Aiello et al. .................. | 310/90 |

FOREIGN PATENT DOCUMENTS

JP 2002-281712 9/2002

* cited by examiner

*Primary Examiner*—Michael C Zarroli
(74) *Attorney, Agent, or Firm*—Louis Woo (57) ABSTRACT

A motor includes a stator and a rotor. The rotor is relative to the stator, and has a rotation axis. A magnet and a magnetic-material member magnetically interact with each other. The magnet and the magnetic-material member are provided for enabling the stator and the rotor to magnetically attracting each other. The magnet has a shape of a ring, and is coaxial with the rotation axis. The magnet has an inner circumference and an outer circumference. The inner circumference and an outer circumference have a common center. The magnet has a plurality of N and S poles alternately arranged along a circumferential direction thereof. At least one of boundaries between the N and S poles extends on a straight line out of the common center. A method of manufacturing the motor, and a method of magnetizing a raw member for the magnet are also disclosed.

9 Claims, 5 Drawing Sheets

MAGNETIZING METHOD, AND MOTOR AND METHOD OF MANUFACTURING MOTOR

BACKGROUND OF THE INVENTION

1. Field of the Invention

This invention generally relates to a motor, a method of manufacturing a motor, and a method of magnetizing a raw member for a magnet in a motor to make the magnet. This invention particularly relates to a magnetizing method, and a motor and its manufacturing method which are designed so that a rotor and a stator magnetically attract each other to provide improved rotation characteristics of the motor.

2. Description of the Related Art

A typical optical disc drive contains a motor for rotating and driving an optical disc. A general laser beam printer (LBP) contains a motor for rotating and driving a polygon mirror. Such motors are required to have extremely stable rotation characteristics.

There are small-sized portable optical disc devices having optical disc drives respectively. In general, such an optical disc device is required to normally operate regardless of the position or attitude of a device body. The position of a motor in the optical disc device depends on that of the device body.

In some cases, a motor in an LBP is in an unusual position to implement the miniaturization of the LBP body. A first example of the unusual position is such that the rotary shaft (the spindle) of the motor tilts relative to the main walls of the LBP casing. A second example of the unusual position is called an inverted position where the rotary shaft of the motor may fall out of its support bearing due to its weight (the rotor is closer to the ground than the stator is).

Accordingly, motors are requested which exhibit stable rotation performances regardless of their positions or attitudes.

In the event that the rotor of a motor in an optical disc drive develops a whirl (an undesirable deflection) due to unsteady support of the rotary shaft of the motor or floats in a direction of slipping out of a related bearing during operation of the motor, the ability of the optical disc drive to read and write information from and on an optical disc is impaired. When a motor in an LBP has a similar problem, the printing performance of the LBP is decreased.

Japanese patent application publication number 2002-281712 discloses a disc driving motor designed to prevent the occurrence of a whirl. The motor in Japanese application 2002-281712 includes a magnet which is designed to attract the rotor of the motor toward the stator to enhance the rotation characteristics of the motor.

Specifically, in the motor of Japanese application 2002-281712, an annular back yoke is fixed to a step on an outer circumferential portion of a bearing holder in a stator side, and an annular bias magnet is bonded to a surface of the back yoke which faces a rotor side. The circumferential-direction magnetic pole width (angular range) of the bias magnet is made uneven. Thereby, an edgewise pressure (a side pressure) is applied to a spindle. A rotor yoke in the rotor side which is opposed to the bias magnet is magnetically attracted toward the stator side so that an undesirable clearance between the spindle and a related bearing can be removed. Therefore, it is possible to prevent the occurrence of a whirl. Furthermore, it is possible to stably maintain the rotation of the rotor at high speeds.

As will be explained later, it is desirable to improve the motor of Japanese application 2002-281712.

SUMMARY OF THE INVENTION

It is a first object of this invention to provide an improved motor.

It is a second object of this invention to provide a method of manufacturing an improved motor.

It is a third object of this invention to provide an improved method of magnetizing a raw member for a magnet in a motor to make the magnet.

A first aspect of this invention provides a method of magnetizing a raw ring for a magnet. The method comprises the steps of placing the raw ring and a magnetizing yoke at prescribed positions where the raw ring and the magnetizing yoke are opposed to each other, wherein the magnetizing yoke has divided segments successively arranged along a circumferential direction with respect to the raw ring, and dividing portions extending between the divided segments, wherein the dividing portions reach regions directly facing a central opening of the raw ring, and wherein the diving portions extend on straight lines out of a center of the raw ring as viewed in an axial direction of the raw ring; and energizing the magnetizing yoke while holding the raw ring and the magnetizing yoke at the prescribed positions.

A second aspect of this invention provides a motor comprising a stator; a rotor being rotatable relative to the stator and having a rotation axis; and a magnet and a magnetic-material member magnetically interacting with each other and being provided for enabling the stator and the rotor to magnetically attracting each other, the magnet having a shape of a ring and being coaxial with the rotation axis, the magnet having an inner circumference and an outer circumference, the inner circumference and the outer circumference having a common center; wherein the magnet has a plurality of N and S poles alternately arranged along a circumferential direction thereof, and at least one of boundaries between the N and S poles extends on a straight line out of the common center.

A third aspect of this invention provides a motor comprising a stator; a rotor being rotatable relative to the stator and having a rotation axis; and a magnet and a magnetic-material member magnetically interacting with each other and being provided for enabling the stator and the rotor to magnetically attracting each other, the magnet having a shape of a ring and being coaxial with the rotation axis, the magnet having an inner circumference and an outer circumference, the inner circumference and the outer circumference having a common center; wherein the magnet has at least four N and S poles alternately arranged along a circumferential direction thereof, and boundaries between the N and S poles extend on straight lines which meet at a single point separate from the common center.

A fourth aspect of this invention provides a motor comprising a stator; a rotor being rotatable relative to the stator and having a rotation axis; and a magnet and a magnetic-material member magnetically interacting with each other and being provided for enabling the stator and the rotor to magnetically attracting each other, the magnet having a shape of a ring and being coaxial with the rotation axis, the magnet having an inner circumference and an outer circumference, the inner circumference and the outer circumference having a common center; wherein the magnet has an N pole and an S pole successively arranged along a circumferential direction thereof, and boundaries between the N pole and the S pole extend on a common straight line distant from the common center.

A fifth aspect of this invention provides a method of manufacturing a motor including a stator, a rotor being rotatable relative to the stator and having a rotation axis, and a magnet and a magnetic-material member magnetically interacting with each other and being provided for enabling the stator and the rotor to magnetically attracting each other, the magnet having a shape of a ring and being coaxial with the rotation axis, the magnet having an inner circumference and an outer circumference, the inner circumference and the outer circumference having a common center, wherein the magnet has a plurality of N and S poles alternately arranged along a circumferential direction thereof, and at least one of boundaries between the N and S poles extends on a straight line out of the common center. The method comprises the steps of positioning the magnet to be coaxial with the rotation axis; and positioning the magnetic-material member to be opposed to the magnet as viewed in an axial direction with respect to the rotation axis.

A sixth aspect of this invention provides a method of manufacturing a motor including a stator, a rotor being rotatable relative to the stator and having a rotation axis, and a magnet and a magnetic-material member magnetically interacting with each other and being provided for enabling the stator and the rotor to magnetically attracting each other, the magnet having a shape of a ring and being coaxial with the rotation axis, the magnet having an inner circumference and an outer circumference, the inner circumference and the outer circumference having a common center, wherein the magnet has a plurality of N and S poles alternately arranged along a circumferential direction thereof, and at least one of boundaries between the N and S poles extends on a straight line out of the common center. The method comprises the steps of magnetizing a raw ring for the magnet to make the magnet in the magnetizing method of the first aspect of this invention; positioning the magnet to be coaxial with the rotation axis; and positioning the magnetic-material member to be opposed to the magnet as viewed in an axial direction with respect to the rotation axis.

This invention has the following advantages. It is possible to easily implement an optimization of a magnetization pattern given to a raw member for a magnet. In this invention, a boundary between magnetic poles on a ring-shaped magnet in a motor extends on a straight line out of the center of the ring. Thereby, it is possible to prevent the occurrence of undesired vibration of the motor.

DETAILED DESCRIPTION OF THE INVENTION

Prior-art motors will be explained below for a better understanding of this invention.

A first prior-art motor disclosed in Japanese patent application publication number 2002-281712 includes a bias magnet with a ring body. The bias magnet is designed as follows. The ring body is coaxial with a spindle. The ring body has a first arc portion extending in an angular range of 90 degrees and magnetized into an N pole, and a second arc portion extending in an angular range of 90 degrees and magnetized into an S pole. The first and second arc portion adjoin each other as viewed in a circumferential direction. The remaining arc portion of the ring body is non-magnetized. The non-magnetized arc portion causes a decrease in an attractive force generated by the bias magnet. To compensate for the attractive-force decrease, it is conceivable to increase the size of the bias magnet or to use expensive magnet material able to produce a strong magnetic force.

A second prior-art motor in Japanese application 2002-281712 includes a bias magnet with a ring body. The bias magnet is designed as follows. The ring body is coaxial with a spindle. The ring body has a first arc portion extending in an angular range of 90 degrees and magnetized into an N pole, a second arc portion extending in an angular range of 90 degrees and magnetized into an S pole, a third arc portion extending in an angular range of 45 degrees and magnetized into an N pole, a fourth arc portion extending in an angular range of 45 degrees and magnetized into an S pole, a fifth arc portion extending in an angular range of 45 degrees and magnetized into an N pole, and a sixth arc portion extending in an angular range of 45 degrees and magnetized into an S pole. The first to sixth arc portions are successively arranged in a circumferential direction. In the second prior-art motor, the circumferential-direction magnetic pole width (angular range) of the bias magnet is uneven. Generally, the uneven magnetic arrangement makes it hard to set the angular ranges of the magnetic poles in the bias magnet to values optimum for an edgewise pressure (a side pressure) applied to the spindle. The easily setting of the angular ranges of the magnetic poles is desired.

Specifically, the magnetization of a raw member for the bias magnet is carried out through the use of a magnetizing yoke corresponding to a desired magnetization pattern. In the case of making the bias magnet having the magnetic poles which extend in the uneven angular ranges as explained above, magnetizing yokes of various types are prepared. Then, samples of the bias magnet are made through the use of the magnetizing yokes. The samples are evaluated and the results of the evaluations are compared to select optimum one from the magnetizing yokes. Then, the selected magnetizing yoke is actually used to make the bias magnet. Thus, the setting of the angular ranges of the magnetic poles in the bias magnet involves hard and complicated steps.

A third prior-art motor in Japanese application 2002-281712 includes a bias magnet which is similar to that in the first prior-art motor except that the bias magnet is eccentric to a spindle. The eccentric structure requires a special arrangement in accurately locating and mounting the bias magnet in position. It is desirable that the bias magnet can be accurately located and mounted in position without the special arrangement.

In the first and second prior-art motors, the boundary or boundaries between the magnetic poles in the bias magnet extend radially. Thus, as viewed in the axial direction, the boundary or boundaries are on lines passing through motor's rotation axis (that is, the axis of the spindle).

Generally, the attractive force generated by a ring-shaped bias magnet peaks at a position corresponding to the boundary between an N pole and an S pole in the bias magnet. The attractive force at a position abruptly weakens as the position is circumferentially remoter from the boundary-corresponding position.

In the case where an attractive force exerted on a rotor side of a motor by a ring-shaped bias magnet is uneven in the circumferential direction and the rotor side has a portion highly sensitive to a magnetic force, the attractive force exerted on the rotor side abruptly increases and decreases each time the highly sensitive portion of the rotor side passes through an angular position directly opposed to the boundary between an N pole and an S pole in the bias magnet during rotation of the rotor side. The abrupt increase and decrease in the exerted attractive force periodically occur so that the motor may undesirably vibrate.

Accordingly, this invention relates to a motor of such a type that a rotor is magnetically attracted toward a stator side by a magnet, and an aim of this invention is to provide a motor which is small in size, which suppresses a manufacturing cost increase, and which is prevented from causing undesired vibration. Another aim of this invention is to provide a method of manufacturing such a motor. A still another aim of this invention is to provide a magnetizing method which allows an optimization of a magnetization pattern of a magnet for enabling a rotor to be attracted toward a stator side.

FIRST EMBODIMENT

Figure 1:
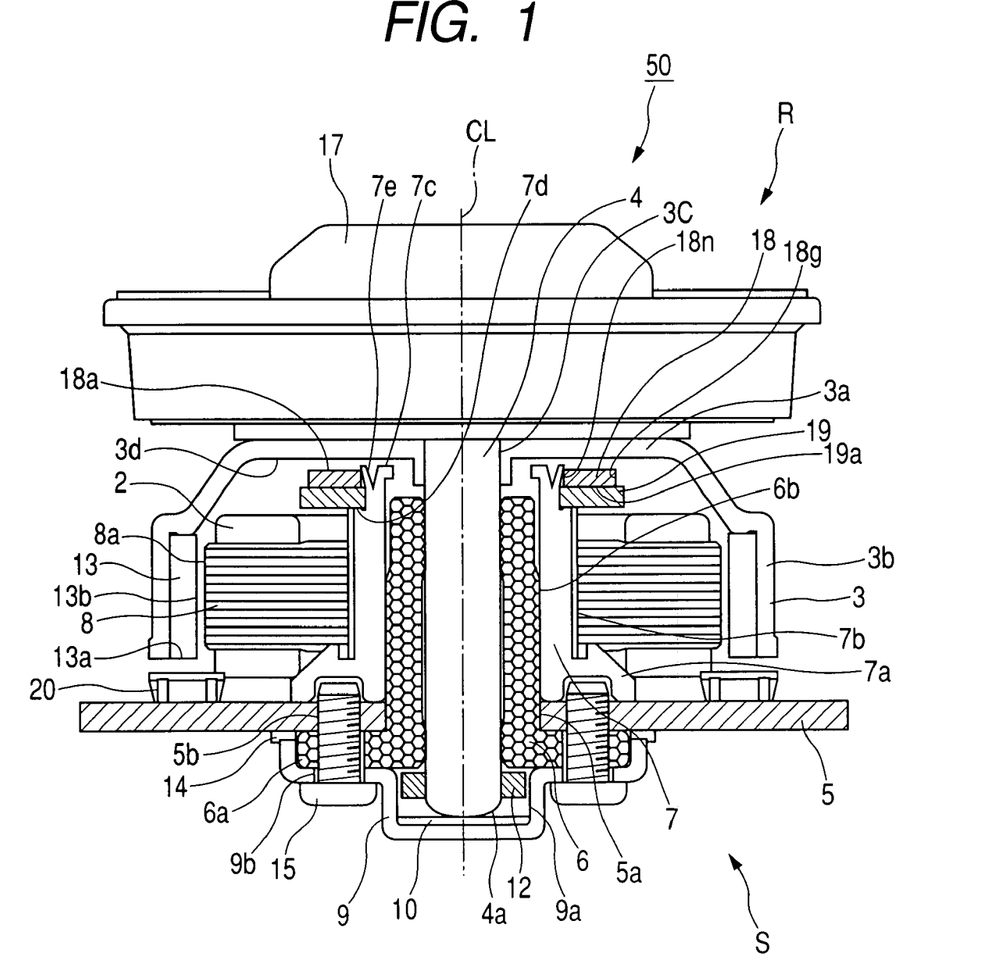
FIG. 1 is a sectional view of a motor according to a first embodiment of this invention.

FIG. 1 shows a motor 50 according to a first embodiment of this invention. The motor 50 is designed to drive, for example, an optical disc. As shown in FIG. 1, the motor 50 has a rotor R and a stator S. The rotor R is rotatably supported on the stator S. The motor 50 has an axis CL coincident with a rotation axis about which the rotor R can rotate.

The rotor R has a disc-shaped or cylindrical body, and a spindle 4 fixed to the rotor body and being coaxial with the axis CL. The spindle 4 is rotatably supported by bearings including a radial bearing 6 taking the shape of a sleeve. The radial bearing 6 is provided between the spindle 4 and the stator S. The spindle 4 coaxially extends through the radial bearing 6.

The stator S includes a motor base 5, the radial bearing 6, a bearing holder 7, and a core 8. The radial bearing 6 is fixed to the motor base 5. The bearing holder 7 substantially has the shape of a sleeve. The radial bearing 6 coaxially fits into the bearing holder 7. Thus, the bearing holder 7 is provided around an outer circumferential surface 6b of the radial bearing 6. The radial bearing 6 is retained by the bearing holder 7.

The core 8 is mounted on and fixed to an outer circumferential surface 7b of the bearing holder 7. Thus, the core 8 extends around the bearing holder 7.

The motor base 5 is a plate made of stainless or other metal. A central part of the motor base 5 has a circular opening 5a through which the spindle 4 and the radial bearing 6 coaxially extend. As viewed in FIG. 1, a lower end of the radial bearing 6 has a flange 6a extending radially outward. The radial bearing 6 is an oil-containing bearing made of a copper-based or iron-based sintered alloy. The radial bearing 6 holds lubricating oil therein.

The flange 6a of the radial bearing 6 has holes through which screws 15 extend. The screws 15 further extend through threaded holes 5b in the motor base 5, thereby engaging the motor base 5. As viewed in FIG. 1, a thrust cover 9 substantially conceals the flange 6a of the radial bearing 6 and a lower end 4a of the spindle 4. The thrust cover 9 has holes 9b through which the screws 15 extend. The screws 15 have heads abutting against the thrust covers 9. The screws 15 press the thrust cover 9 and the flange 6a of the radial bearing 6 against the motor base 5. Thereby, the screws 15 fix the thrust cover 9 and the flange 6a of the radial bearing 6 to the motor base 5.

The bearing holder 7 coaxially fits on the radial bearing 6. The bearing holder 7 is fixed to the outer circumferential surface 6b of the radial bearing 6. As viewed in FIG. 1, a lower end of the bearing holder 7 has a flange 7a extending radially outward. The flange 7a abuts against the motor base 5. During the assembly of the motor 50, the bearing holder 7 is moved to a normal position under pressure, being mounted on the radial bearing 6 and the motor base 5. The bearing holder 7 is made of non-magnetic material such as brass.

The core 8 is substantially annular. The core 8 extends around the bearing holder 7. The core 8 is fixed to the outer circumferential surface 7b of the bearing holder 7. An outer circumferential portion of the core 8 has a plurality of projecting pole pieces on which windings 2 are provided respectively. The core 8 includes a laminate of silicon steel sheets.

The rotor R includes a rotor yoke 3, the spindle 4, and an annular drive magnet 13. The rotor yoke 3 is provided with a turn table 17 on which an optical disc (not shown) is placed. As viewed in FIG. 1, an upper end of the spindle 4 fits into a central opening 3c in the rotor yoke 3. The spindle 4 is fixed to the rotor yoke 3. During the assembly of the motor 50, the spindle 4 is moved to a normal position relative to the rotor yoke 3 under pressure. The drive magnet 13 is fixed to the rotor yoke 3. The rotor R has an outside diameter of, for example, about 25 mm.

As viewed in FIG. 1, the rotor yoke 3 takes an inverted cup shape. The rotor yoke 3 is coaxial with the spindle 4. The rotor yoke 3 has a disc-shaped base 3a, and a cylindrical portion 3b axially extending from an outer edge of the base 3a. Preferably, the base 3a and the cylindrical portion 3b are integral with each other. The cylindrical portion 3b substantially extends along a direction parallel to the axis CL of the motor 50. A major part of the cylindrical portion 3b is located radially outward of the core 8. The rotor yoke 3 is made of magnetic material such as iron-based material.

A central part of the base 3a of the rotor yoke 3 has the central opening 3c into which the upper end of the spindle 4 fits. The spindle 4 is fixed to the base 3a of the rotor yoke 3. During the assembly of the motor 50, the spindle 4 is moved to a normal position relative to the base 3a of the rotor yoke 3 under pressure.

The drive magnet 13 has an outer circumferential surface fixed to an inner circumferential surface of the cylindrical portion 3b of the rotor yoke 3. An inner circumferential surface 13b of the drive magnet 13 is opposed to an outer circumferential surface 8a of the core 8. The inner circumferential surface 13b of the drive magnet 13 and the outer circumferential surface 8a of the core 8 are radially spaced from each other by a prescribed clearance or spacing.

There is a sensor 20 for detecting a magnetic flux generated by the drive magnet 13. The sensor 20 is provided on and fixed to the motor base 5 by, for example, soldering. The sensor 20 includes a Hall effect device. As viewed in FIG. 1, the sensor 20 faces a lower end surface 13a of the drive magnet 13.

The spindle 4 extends coaxially through the radial bearing 6. The spindle 4 is rotatably supported by the radial bearing 6. Thereby, the rotor R is rotatably supported by the stator S.

As viewed in FIG. 1, the lower end 4a of the spindle 4 projects from the radial bearing 6. During the assembly of the motor 50, the spindle 4 is inserted into the radial bearing 6. A stop ring 12 is fixed to the lower end 4a of the spindle 4. During the assembly of the motor 50, the stop ring 12 is mounted on the lower end 4a of the spindle 4 after the spindle 4 is inserted into the radial bearing 6. The stop ring 12 is made of stainless-steel-based spring material. The stop ring 12 prevents the spindle 4 from moving out of the radial bearing 6.

The thrust cover 9 is made of metal. As previously mentioned, the thrust cover 9 and the flange 6a of the radial bearing 6 are fixed to the motor base 5 by the screws 15. The thrust cover 9 is formed with a recess 9a by drawing. A thrust plate 10 is attached to an inner surface of the thrust cover 9 which defines a bottom of the recess 9a. The thrust plate 10 is made of resin. As viewed in FIG. 1, a lower end surface of the spindle 4 is in contact with the thrust plate 10. The lower end surfaced of the spindle 4 has a shape of a part of a sphere. The thrust plate 10 supports the spindle 4 and the rotor R in the thrust direction.

As viewed in FIG. 1, an annular oil seal 14 is provided between the motor base 5 and an upper end of the thrust cover 9. The oil seal 14 is made of rubber-based resilient material such as silicone rubber. The oil sealing 14 prevents a leakage of the lubricating oil from the motor 50. It should be noted that the lubricating oil is originally held in the radial bearing 6.

A structure for magnetically attracting the rotor R toward the stator S will be described below. An outer circumferential surface of an end 7c of the bearing holder 7 which faces the major part of the rotor R (that is, an upper end 7c of the bearing holder 7 as viewed in FIG. 1) is formed with an annular step 7d defining the boundary between a smaller-outside-diameter portion and a larger-outside-diameter portion. As viewed in FIG. 1, the step 7d faces upward so that the larger-outside-diameter portion extends below the smaller-outside diameter portion.

A ring-shaped back yoke 19 is coaxially provided or seated on the step 7d of the bearing holder 7. The back yoke 19 is made of iron. As viewed in FIG. 1, a ring-shaped bias magnet 18 is coaxially mounted on an upper end surface of the back yoke 19. The bias magnet 19 is coaxial with the axis CL of the motor 50. The bias magnet 18 has an inner circumference 18n and an outer circumference 18g. The inner circumference 18n and the outer circumference 18g have a common center coincident with a point in the axis CL of the motor 50. The common center is the same as the ring center, that is, the center of the ring (the bias magnet 18). The bias magnet 19 includes, for example, an Nd—Fe—B bond magnet.

As viewed in FIG. 1, an upper end surface of the bearing holder 7 has a circumferentially-extending cut groove 7e with a prescribed depth in a direction parallel to the axis CL of the motor 50. During the assembly of the motor 50, after the back yoke 19 is placed on the step 7d of the bearing holder 7, a portion of the wall of the bearing holder 7 which extends radially outward of the cut groove 7e is bent or crimped radially outward into engagement with the back yoke 19. Thereby, the back yoke 19 is firmly retained by and fixed to the bearing holder 7. Specifically, the back yoke 19 is firmly held between the step 7d of the bearing holder 7 and the radially-outward-bent portion thereof. Then, the bias magnet 18 is bonded and fixed to the back yoke 19 by adhesive. The bias magnet 18 and the back yoke 19 magnetically interact with each other, and develop an attractive force by which the bias magnet 18 adheres to the back yoke 19.

An end surface 18a of the bias magnet 18 which faces the major part of the rotor R (that is, an upper end surface 18a of the bias magnet 18 as viewed in FIG. 1) is opposed to a surface 3d of the base 3a of the rotor yoke 3 (that is, a lower surface 3d of the base 3a of the rotor yoke 3 as viewed in FIG. 1). The upper end surface 18a of the bias magnet 18 and the lower surface 3d of the base 3a of the rotor yoke 3 are axially spaced from each other by a prescribed clearance or spacing. A magnetic flux generated by the bias magnet 18 causes the base 3a of the rotor yoke 3 to be attracted toward the bias magnet 18. The attractive force exerted on the base 3a of the rotor yoke 3 is chosen so that the spindle 4 will remain in contact with the thrust plate 10 even when the motor 50 is in an inverted position (that is, a position where the gravity forces the spindle 4 in the direction of falling out of the radial bearing 6). Therefore, the rotor R is prevented from undesirably moving or vibrating relative to the stator S in the thrust direction (the axial direction) regardless of the position of the motor 50.

As previously mentioned, the bias magnet 18 takes a shape of a ring. Thus, the bias magnet 18 has an inside diameter $\phi 1$ and an outside diameter $\phi 2$ passing through the ring center C (see FIG. 2). The inside diameter $\phi 1$ is the same as the diameter of the inner circumference 18n of the bias magnet 18. The outside diameter $\phi 2$ is the same as the diameter of the outer circumference 18g of the bias magnet 18. The outside diameter $\phi 2$ is equal to, for example, about 15 mm when the outside diameter of the rotor R is equal to about 25 mm. The magnetization of the bias magnet 18 is in a pattern selected from different prescribed patterns P1, P2, P3, P4, P5, P6, and P7 mentioned hereafter.

Figure 2:
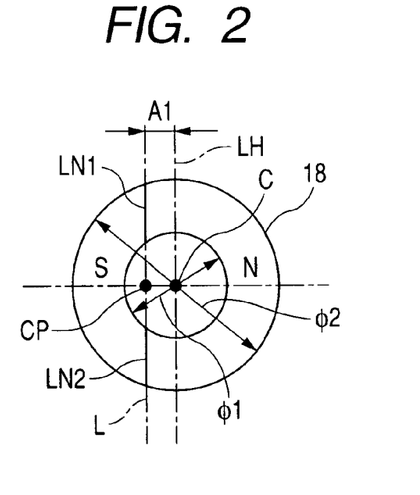
FIG. 2 is a plan view of a bias magnet in FIG. 1 which has a first prescribed magnetization pattern.

FIG. 2 shows the prescribed pattern P1 of the magnetization of the bias magnet 18. The magnetization pattern P1 consists of two pole regions, that is, an N pole region and an S pole region arranged in the circumferential direction of the ring (the bias magnet 18). The N pole region is greater in angular dimension than the S pole region. There are boundaries LN1 and LN2 between the N pole region and the S pole region. These boundaries are also called the inter-pole boundaries. As viewed along the axial direction of the ring, the boundaries LN1 and LN2 extend on a straight line L which is parallel to a diametrical line LH passing through the ring center C, and which is at a prescribed distance A1 from the diametrical line LH. Thus, the straight line L, on which the boundaries LN1 and LN2 extend, is out of the ring center C. The prescribed distance A1 is also called the eccentricity quantity A1. As viewed in the axial direction of the ring, extensions of the boundaries LN1 and LN2 meet at a point (a cross point) CP distant from the ring center C. It should be noted that "extensions" of the boundaries mean virtual lines extending from the boundaries. The straight line L, on which the boundaries LN1 and LN2 extend, deviates from radial directions with respect to the ring.

Figure 3:
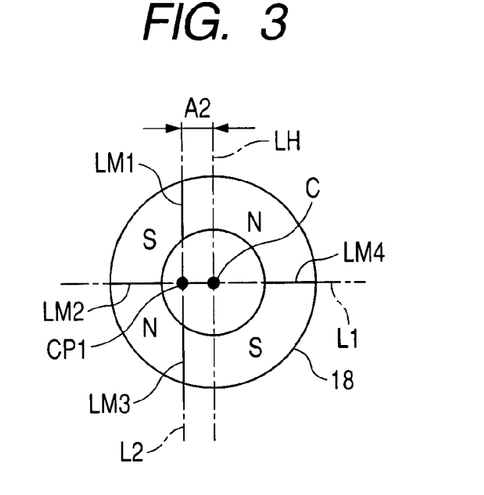
FIG. 3 is a plan view of the bias magnet in FIG. 1 which has a second prescribed magnetization pattern.

FIG. 3 shows the prescribed pattern P2 of the magnetization of the bias magnet 18. The magnetization pattern P2 consists of four pole regions, that is, a first N pole region, a first S pole region, a second N pole region, and a second S pole region which are successively arranged in the circumferential direction of the ring (the bias magnet 18). The first N pole region and the first S pole region are equal in angular dimension. The second N pole region and the second S pole region are equal in angular dimension. The first N pole region and the first S pole region are greater in angular dimension than the second N pole region and the second S pole region. There are a boundaries LM1 between the first N pole region and the second S pole region, a boundary LM2 between the second S pole region and the second N pole region, a boundary LM3 between the second N pole region and the first S pole region, and a boundary LM4 between the first S pole region and the first N pole region. As viewed in the axial direction of the ring, the boundaries LM1 and LM3 extend on a straight line L2 which is parallel to a diametrical line LH passing through the ring center C, and which is at a prescribed distance (an eccentricity quantity) A2 from the diametrical line LH. Thus, the straight line L2, on which the boundaries LM1 and LM3 extend, is out of the ring center C. As viewed in the axial direction, the boundaries LM2 and LM4 extend on a straight line L1 which passes through the ring center C, and which is perpendicular to the straight line L2 and the diametric line LH. Furthermore, extensions of the boundaries LM1, LM2, LM3, and LM4 meet at a point (a cross point) CP1 distant from the ring center C. In addition, the straight lines L1 and L2, on which the boundaries LM1, LM2, LM3, and LM4 extend, meet at the point CP1. The straight line L2, on which the boundaries LM1 and LM3 extend, deviates from radial directions with respect to the ring.

Figure 4:
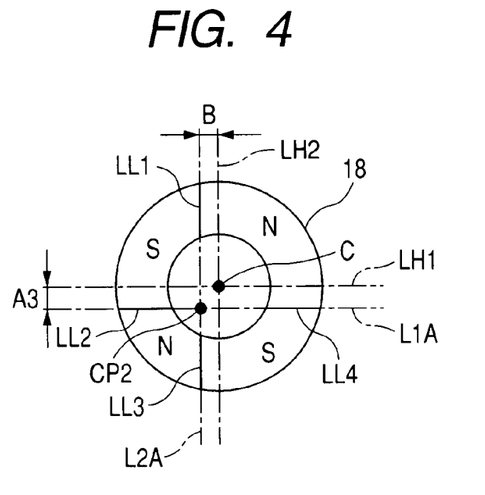
FIG. 4 is a plan view of the bias magnet in FIG. 1 which has a third prescribed magnetization pattern.

FIG. 4 shows the prescribed pattern P3 of the magnetization of the bias magnet 18. The magnetization pattern P3 consists of four pole regions, that is, a first N pole region, a first S pole region, a second N pole region, and a second S pole region which are successively arranged in the circumferential direction of the ring (the bias magnet 18). The first N pole region is greater in angular dimension than the first S pole region, the second N pole region, and the second S pole region. The first S pole region and the second S pole region are substantially or exactly equal in angular dimension. The first S pole region and the second S pole region are greater in angular dimension than the second N pole region. There are a boundaries LL1 between the first N pole region and the second S pole region, a boundary LL2 between the second S pole region and the second N pole region, a boundary LL3 between the second N pole region and the first S pole region, and a boundary LL4 between the first S pole region and the first N pole region. As viewed in the axial direction of the ring, the boundaries LL1 and LL3 extend on a straight line L2A which is parallel to a diametrical line LH2 passing through the ring center C, and which is at a prescribed distance (an eccentricity quantity) B from the diametrical line LH2. Furthermore, the boundaries LL2 and LL4 extend on a straight line L1A which is parallel to a diametrical line LH1 passing through the ring center C, and which is at a prescribed distance (an eccentricity quantity) A3 from the diametrical line LH1. Thus, the straight lines L1A and L2A, on which the boundaries LL1, LL2, LL3, and LL4 extend, are out of the ring center C. The straight lines L1A and L2A are perpendicular to each other. As viewed in the axial direction of the ring, extensions of the boundaries LL1, LL2, LL3, and LL4 meet at a point (a cross point) CP2 distant from the ring center C. In addition, the straight lines L1A and L2A, on which the boundaries LL1, LL2, LL3, and LL4 extend, meet at the point CP2 and deviate from radial directions with respect to the ring.

Figure 5:
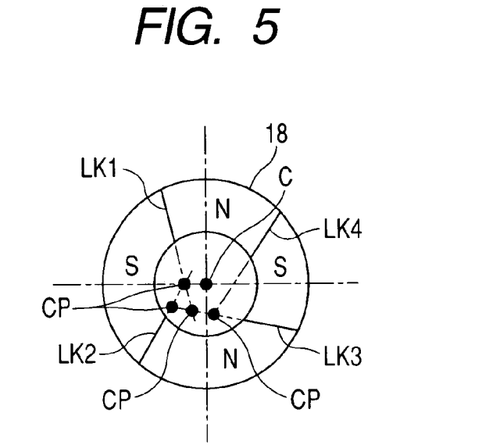
FIG. 5 is a plan view of the bias magnet in FIG. 1 which has a fourth prescribed magnetization pattern.

FIG. 5 shows the prescribed pattern P4 of the magnetization of the bias magnet 18. The magnetization pattern P4 consists of four pole regions, that is, a first N pole region, a first S pole region, a second N pole region, and a second S pole region which are successively arranged in the circumferential direction of the ring (the bias magnet 18). There are a boundaries LK1 between the first N pole region and the second S pole region, a boundary LK2 between the second S pole region and the second N pole region, a boundary LK3 between the second N pole region and the first S pole region, and a boundary LK4 between the first S pole region and the first N pole region. As viewed in the axial direction of the ring, the boundaries LK1, LK2, LK3, and LK4 extend on different straight lines respectively, and any threes of extensions of the boundaries LK1, LK2, LK3, and LK4 do not meet at a single point. Furthermore, the straight lines, on which the boundaries LK1, LK2, LK3, and LK4 extend, are out of the ring center C and deviate from radial directions with respect to the ring.

The prescribed pattern P5 of the magnetization of the bias magnet 18 corresponds to generalization of the prescribed patterns P1 and P3 (the patterns in FIGS. 2 and 4). The magnetization pattern P5 consists of pole regions, the number of which is equal to a predetermined positive even number "n" where "n" denotes one of 2, 4, 6, 8, 10, 12, 14, 16 . . . The pole regions are alternately-arranged N and P pole regions. There are boundaries between the pole regions. The boundaries are in pairs each having substantially diametrically opposed ones. As viewed in the axial direction of the ring, boundaries in each of the pairs extend on a common straight line distant from the ring center C. Furthermore, extensions of all the boundaries meet at a same point (a same cross point) distant from the ring center C. Thus, the boundaries extend on the "n/2" straight lines which do not pass through the ring center C and which meet at the same point. The "n/2" straight lines, on which the boundaries extend, are out of the ring center C and deviate from radial directions with respect to the ring.

The prescribed pattern P6 of the magnetization of the bias magnet 18 corresponds to generalization of the prescribed pattern P2 (the pattern in FIG. 3). The magnetization pattern P6 consists of pole regions, the number of which is equal to a predetermined positive even number "n" where "n" denotes one of 2, 4, 6, 8, 10, 12, 14, 16 . . . The pole regions are alternately-arranged N and P pole regions. There are boundaries between the pole regions. The boundaries are in pairs each having substantially diametrically opposed ones. The pairs of first and second types. For example, there is only one second-type pair. As viewed in the axial direction of the ring, boundaries in each of the first-type pairs extend on a common straight line distant from the ring center C. The straight lines, on which the boundaries in the first-type pairs extend, are out of the ring center C and deviate from radial directions with respect to the ring. As viewed in the axial direction of the ring, boundaries in the second-type pair extend on a common diametrical line which passes through the ring center C. Furthermore, extensions of all the boundaries in the first-type and second-type pairs meet at a same point (a same cross point) distant from the ring center C. Thus, the boundaries are on the "n/2" straight lines which meet at the same point distant from the ring center C. One of the "n/2" straight lines passes through the ring center C while the others do not.

The prescribed pattern P7 of the magnetization of the bias magnet 18 corresponds to generalization of the prescribed pattern P4 (the pattern in FIG. 5). The magnetization pattern P7 consists of pole regions, the number of which is equal to a predetermined positive even number "n" where "n" denotes one of 2, 4, 6, 8, 10, 12, 14, 16 . . . The pole regions are alternately-arranged N and P pole regions. There are boundaries between the pole regions. As viewed in the axial direction of the ring, the boundaries extend on different straight lines respectively, and any threes of extensions of the boundaries do not meet at a single point. Furthermore, the straight lines, on which the boundaries extend, are out of the ring center C and deviate from radial directions with respect to the ring.

In general, a basic magnetization pattern of a ring-shaped magnet consists of pole regions, the number of which is equal to a predetermined positive even number "n". The pole regions are alternately-arranged N and P pole regions. There are boundaries between the pole regions. The boundaries are in pairs each having diametrically opposed ones. In the basic magnetization pattern, boundaries in each of the pairs extend on a common straight line passing through the ring center C. Accordingly, there are "n/2" straight lines which pass through the ring center C, and on which the boundaries extend.

The patterns in FIGS. 2, 3, and 4 result from translations of such a basic magnetization pattern. The manufacture of the motor 50 includes a magnetizing step in which a ring-shaped raw member for the bias magnet 18 is magnetized by a magnetizing yoke so that the raw member is changed into the bias magnet 18. The pattern of the magnetization of the bias magnet 18 depends on the positional relation between the magnetizing yoke and the raw member for the bias magnet 18 during the magnetizing step.

Figure 6:
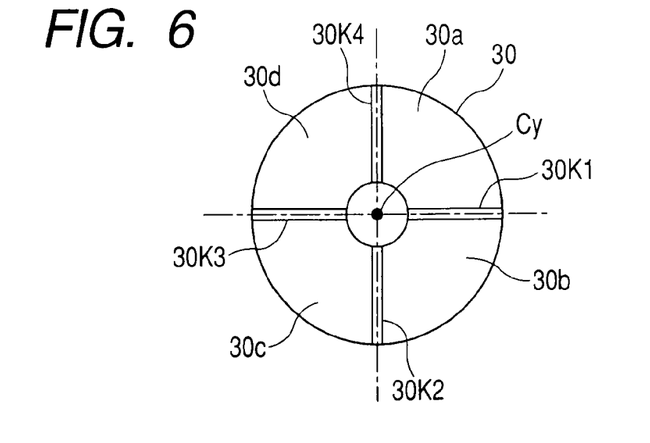
FIG. 6 is a plan view of a magnetizing yoke used for making the bias magnet in FIG. 1.

The details of the magnetizing step will be indicated below. With reference to FIG. 6, a magnetizing yoke 30 is used in the magnetizing step to magnetize a ring-shaped raw member for the bias magnet 18. The magnetizing yoke 30 may be of a conventional general-purpose type.

The magnetizing yoke 30 is designed for 4-pole magnetization. The magnetizing yoke 30 has a circular shape. The major part of the magnetizing yoke 30 is divided into four independent sectoral segments 30a, 30b, 30c, and 30d each extending in an angular range of 90 degrees. The yoke segments 30a, 30b, 30c, and 30d are successively arranged in the circumferential direction with respect to the magnetizing yoke 30. Radially-extending dividing portions 30K1, 30K2, 30K3, and 30K4 are provided between the yoke segments 30a, 30b, 30c, and 30d. The dividing portions 30K1, 30K2, 30K3, and 30K4 are spaced at equal angular intervals (90-degree intervals). As viewed in the axial direction with respect to the magnetizing yoke 30, the dividing portions 30K1 and 30K3 extend along a first diametrical line passing through the center Cy of the magnetizing yoke 30. Furthermore, the dividing portions 30K2 and 30K4 extend along a second diametrical line perpendicular to the first diametrical line and passing through the center Cy of the magnetizing yoke 30. Windings (not shown) are provided on the yoke segments 30a, 30b, 30c, and 30d, respectively. When the windings are energized, the yoke segments 30a, 30b, 30c, and 30d generate magnetic fields corresponding to N and P poles which alternate as viewed in the circumferential direction with respect to the magnetizing yoke 30.

During the magnetizing step, the raw member for the bias magnet 18 is brought into contact with or located near the magnetizing yoke 30. The raw member and the magnetizing yoke 30 are opposed to each other. Then, the magnetizing yoke 30 is activated or energized to generate magnetic fields acting on the raw member for the bias magnet 18. The generated magnetic fields magnetize the raw member so that the raw member is formed with magnetic poles and is thus changed into the bias magnet 18. The formed magnetic poles and a pattern thereof depend on the positional and configurative relation between the yoke segments 30a, 30b, 30c, and 30d and portions of the raw member which are opposed thereto.

Figure 7:
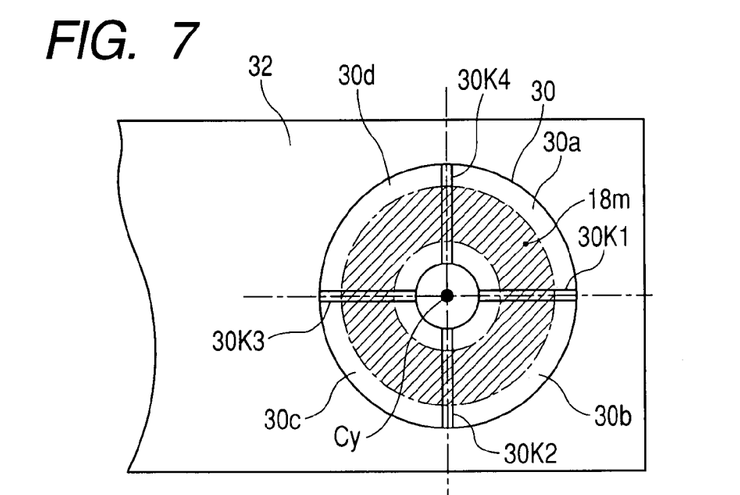
FIG. 7 is a diagrammatic plan view of a locating jig, a magnetizing yoke fixed to the jig, and a raw member for a bias magnet which is provided on the jig in conditions where the magnetizing yoke and the raw member are located coaxially.
Figure 8:
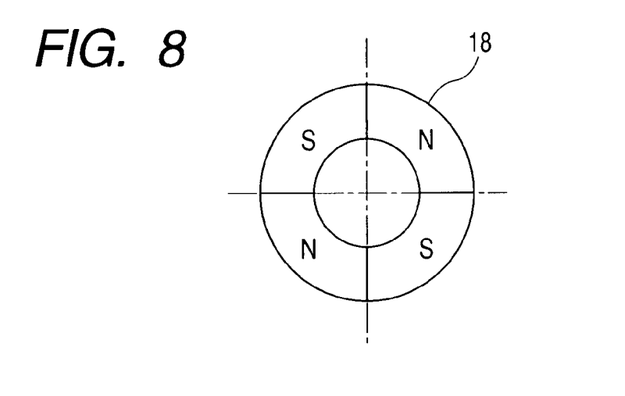
FIG. 8 is a plan view of a bias magnet having a balanced magnetization pattern made under the conditions of FIG. 7.

With reference to FIG. 7, the magnetizing yoke 30 is fixed to a locating jig 32. A ring-shaped raw member 18m for the bias magnet 18 is provided on the jig 32. The raw member 18m is located so as to be coaxial with the magnetizing yoke 30 and be opposed thereto. Thus, the center of the raw member 18m aligns with the center Cy of the magnetizing yoke 30. Radially inner ends of the dividing portions 30K1, 30K2, 30K3, and 30K4 reach regions directly facing a central opening in the raw member 18m. Then, the magnetizing yoke 30 is activated or energized while the magnetizing yoke 30 and the raw member 18m are held in position with respect to the jig 32. Consequently, the raw member 18m is formed with four magnetic poles and is thus changed into the bias magnet 18. In this case, as shown in FIG. 8, the four magnetic pole regions on the bias magnet 18 are equal in angular range (circumferential angular width), and constitute a balanced magnetization pattern.

Figure 9:
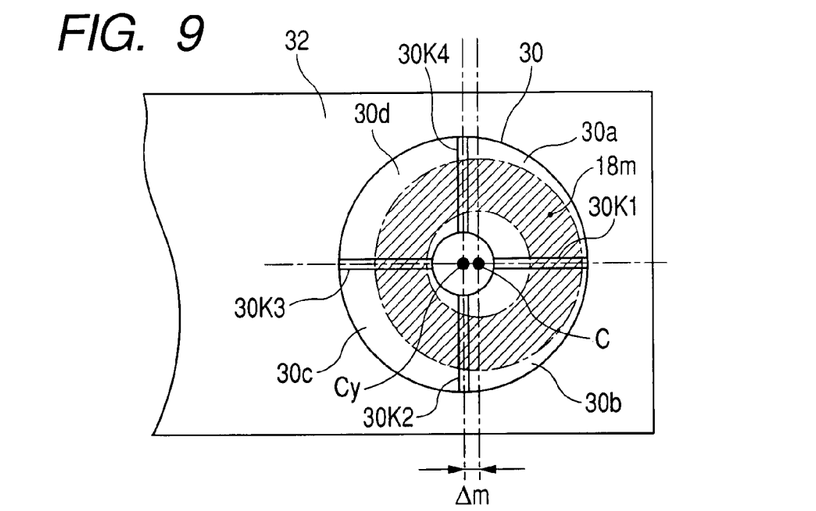
FIG. 9 is a diagrammatic plan view of a locating jig, a magnetizing yoke fixed to the jig, and a raw member for a bias magnet which is provided on the jig in conditions where the magnetizing yoke and the raw member are located eccentrically.
Figure 10:
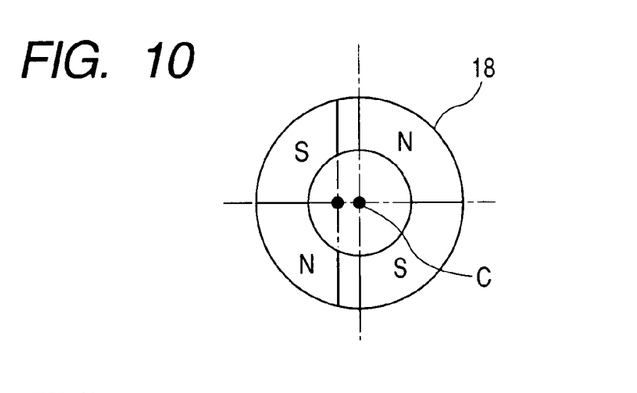
FIG. 10 is a plan view of a bias magnet having a magnetization pattern made under the conditions of FIG. 9.

With reference to FIG. 9, the raw member 18m provided on the jig 32 is located so as to be eccentric to the magnetizing yoke 30 and be opposed thereto. Thus, the center C of the raw member 18m is out of alignment with the center Cy of the magnetizing yoke 30. Specifically, the center C of the raw member 18m is radially separated from the center Cy of the magnetizing yoke 30 toward the dividing portion 30K1 of the magnetizing yoke 30 by a prescribed distance $\Delta m$ in a direction parallel to the dividing portion 30K1. Radially inner ends of the dividing portions 30K1, 30K2, 30K3, and 30K4 reach regions directly facing the central opening in the raw member 18m. As viewed in the axial direction of the magnetizing yoke 30 or the raw member 18m, the dividing portions 30K2 and 30K4 extend on a straight line out of the center of the raw member 18m and deviating from radial directions with respect to the raw member 18m. Then, the magnetizing yoke 30 is activated or energized while the magnetizing yoke 30 and the raw member 18m are held in position with respect to the jig 32. Consequently, the raw member 18m is formed with four magnetic poles and is thus changed into the bias magnet 18. In this case, as shown in FIG. 10, the four magnetic poles on the bias magnet 18 are in a pattern equal to that of FIG. 3. When the center C of the raw member 18m is radially separated from the center Cy of the magnetizing yoke 30 in a direction parallel to none of the dividing portions 30K1, 30K2, 30K3, and 30K4 during the above-mentioned procedure, the four resultant magnetic poles on the bias magnet 18 are in a pattern equal to that of FIG. 4.

The magnetization pattern of the bias magnet 18 depends on the position of a raw member for the bias magnet 18 relative to the magnetizing yoke 30 during the magnetizing step. Specifically, the magnetization pattern of the bias magnet 18 can be changed among various patterns including the previously-mentioned prescribed patterns P1, P2, P3, P5, and P6. Therefore, it is easy to implement an optimization of the magnetization pattern of the bias magnet 18 for an edgewise pressure (a side pressure) applied to the spindle 4.

A conventional magnetizing yoke can be used as the magnetizing yoke 30. For example, samples of the bias magnet 18 which have different magnetization patterns are made through the use of the single magnetizing yoke 30 of the conventional type. In this case, the positional relation between the magnetizing yoke 30 and a raw member for the bias magnet 18 is varied from sample to sample. Then, the samples or the different magnetization patterns are evaluated regarding an edgewise pressure applied to the spindle 4. Best one is selected from the samples or the different magnetization patterns by referring to the results of the evaluation. Therefore, it is possible to inexpensively implement an optimization of the magnetization pattern of the bias magnet 18 for an edgewise pressure applied to the spindle 4.

Figure 11:
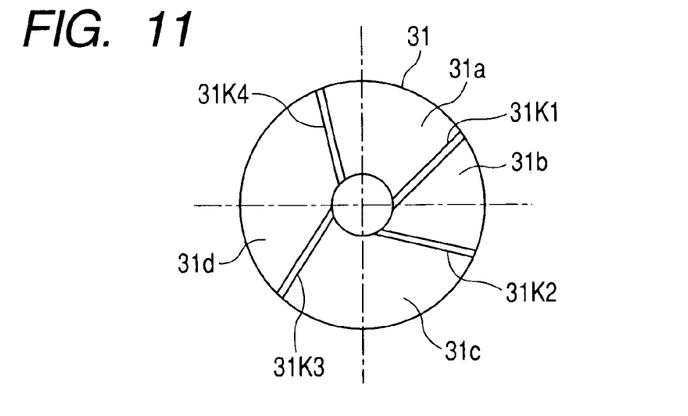
FIG. 11 is a plan view of another magnetizing yoke used for making the bias magnet in FIG. 1.

FIG. 11 shows a magnetizing yoke 31 which can be used instead of the magnetizing yoke 30 (see FIGS. 6, 7, and 9). The magnetizing yoke 31 is designed for 4-pole magnetization. The magnetizing yoke 31 has a circular shape. The major part of the magnetizing yoke 31 is divided into four independent quasi-sectoral segments 31a, 31b, 31c, and 31d. The yoke segments 31a, 31b, 31c, and 31d are successively arranged in the circumferential direction with respect to the magnetizing yoke 31. Dividing portions 31K1, 30K2, 30K3, and 30K4 are provided between the yoke segments 31a, 31b, 31c, and 31d. As viewed in axial direction with respect to the magnetizing yoke 31, the dividing portions 31K1, 31K2, 31K3, and 31K4 extend on respective straight lines different from each other. Preferably, the straight lines, on which the dividing portions 31K1, 31K2, 31K3, and 31K4 extend, are out of the center of the magnetizing yoke 31 and deviate from radial directions with respect to the magnetizing yoke 31. As viewed in the axial direction, any threes of extensions of the dividing portions 31K1, 31K2, 31K3, and 31K4 do not meet a single point. Preferably, the areas of the yoke segments 31a, 31b, 31c, and 31d are different from each other. Alternatively, the areas of the yoke segments 31a, 31b, 31c, and 31d may be equal to each other. Windings (not shown) are provided on the yoke segments 31a, 31b, 31c, and 31d, respectively. When the windings are energized, the yoke segments 31a, 31b, 31c, and 31d generate magnetic fields corresponding to N and P poles which alternate as viewed in the circumferential direction with respect to the magnetizing yoke 31.

During the magnetizing step, a raw member for the bias magnet 18 is brought into contact with or located near the magnetizing yoke 31. The raw member and the magnetizing yoke 31 are opposed to each other. Preferably, the raw member and the magnetizing yoke 31 are coaxial with each other. As viewed in the axial direction of the magnetizing yoke 31 or the raw member, the dividing portions 31K1, 31K2, 31K3, and 31K4 extend on straight lines out of the center of the raw member and deviating from radial directions with respect to the raw member. Then, the magnetizing yoke 31 is activated or energized to generate magnetic fields acting on the raw member for the bias magnet 18. The generated magnetic fields magnetize the raw member so that the raw member is formed with magnetic poles and is thus changed into the bias magnet 18. The formed magnetic poles and a pattern thereof depend on the positional and configurative relation between the yoke segments 31a, 31b, 31c, and 31d and portions of the raw material which are opposed thereto. In this case, the resultant magnetization pattern of the bias magnet 18 is equal or similar to that of FIG. 5 (the prescribed pattern P4).

The magnetization pattern of the bias magnet 18 depends on the position of a raw member for the bias magnet 18 relative to the magnetizing yoke 31 during the magnetizing step. Specifically, the magnetization pattern of the bias magnet 18 can be changed among various patterns equal or similar to that of FIG. 5 (the prescribed pattern P4). Therefore, it is easy to implement an optimization of the magnetization pattern of the bias magnet 18 for an edgewise pressure (a side pressure) applied to the spindle 4.

Generally, the attractive force generated by the bias magnet 18 peaks at a position corresponding to each of the inter-pole boundaries thereon. Each of the prescribed magnetization patterns P1-P7 of the bias magnet 18 has at least two inter-pole boundaries extending on a line or lines off of the center of the bias-magnet ring and deviating from radial directions with respect to the ring. Such inter-pole boundaries suppress a variation in the attractive force exerted on the rotor R by the bias magnet 18 during the rotation of the rotor R. This suppression can prevent the motor 50 from undesirably vibrating during the operation thereof.

Figure 12:
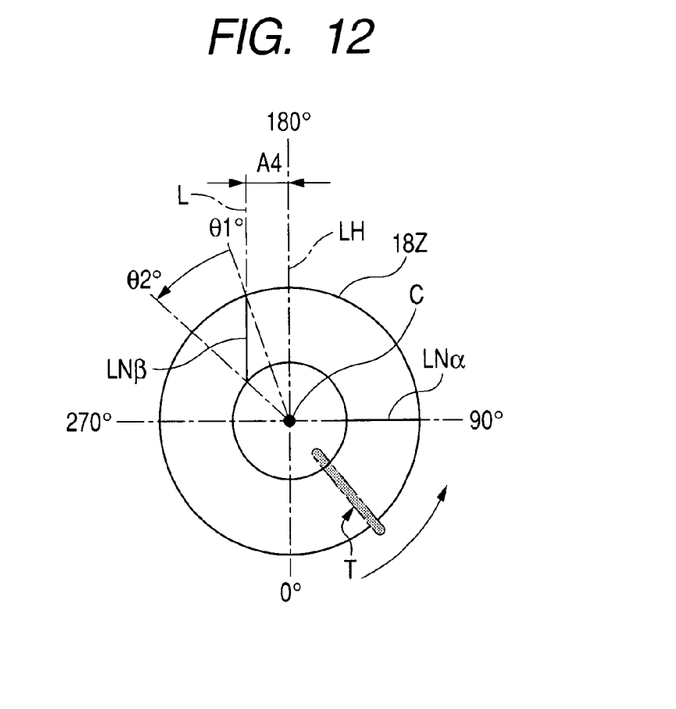
FIG. 12 is a diagrammatic plan view of a bias magnet and a highly magnetically-sensitive portion of a rotor yoke.

FIG. 12 shows a ring-shaped bias magnet 18Z which can be used instead of the bias magnet 18. The bias magnet 18Z has a magnetization pattern including inter-pole boundaries LNα and LNβ. The inter-pole boundary LNα extends exactly radially with respect to the ring (the bias magnet 18Z). In other words, the inter-pole boundary LNα extends on a straight line or a diametrical line passing through the center of the ring. On the other hand, the inter-pole boundary LNβ extends on a straight line out of the center of the ring and deviating from radial directions with respect to the ring.

The bias magnet 18Z is fixed to the body of the stator S. An end surface of the bias magnet 18Z which faces the major part of the rotor R is opposed to the surface 3d of the base 3a of the rotor yoke 3 (see FIG. 1).

With reference to FIG. 12, it is assumed that the base 3a of the rotor yoke 3 has a portion T which is highly sensitive to a magnetic force, which is opposed to the bias magnet 18Z, and which extends radially with respect to the bias magnet 18Z. The sensitive portion T rotates relative to the bias magnet 18Z in accordance with the rotation of the rotor R. During constant-speed counterclockwise rotation of the sensitive portion T from an angular position of 0 degree relative to the bias magnet 18Z, the strength of the attractive force exerted on the sensitive portion T by the bias magnet 18Z varies as shown in FIG. 13.

As shown in FIG. 12, the inter-pole boundary LNα on the bias magnet 18Z is located at an angular position of 90 degrees. The inter-pole boundary LNβ on the bias magnet 18Z extends on a straight line L which is parallel to a diametrical line LH passing through the center of the bias magnet 18Z and an angular position of 0 degree, and which is at a prescribed distance (an eccentricity quantity) A4 from the diametrical line LH. Thus, the straight line L, on which the inter-pole boundary LNβ extends, is out of the ring center (the magnet center) and deviates from a radial direction with respect to the bias magnet 18Z. The inter-pole boundary LNβ on the bias magnet 18Z occupies an angular range from an angular position θ1° to an angular position θ2°. As previously mentioned, the inter-pole boundary LNα extends on a straight line or a diametrical line passing through the center of the ring. The inter-pole boundary LNα occupies substantially only an angular position of 90 degrees. Therefore, the attractive force Fα exerted on the sensitive portion T by the inter-pole boundary LNα varies in a sharp triangular pulse and takes a peak Pwα when the sensitive portion T passes through an angular position of 90 degrees during the rotation of the rotor R. As previously mentioned, the inter-pole boundary LNβ extends on a straight line out of the center of the ring and deviating from radial directions with respect to the ring. Since the inter-pole boundary LNβ occupies the angular range from the angular position θ1° to the angular position θ2°, the attractive force Fβ exerted on the sensitive portion T by the inter-pole boundary LNβ varies in a trapezoidal pulse and takes a peak Pwβ when the sensitive portion T passes through the angular range from the angular position θ1° to the angular position θ2°. The total energy related to the attractive force Fβ is substantially equal to that related to the attractive force Fα. Since the inter-pole boundary LNα substantially occupies only an angular position of 90 degrees while the inter-pole boundary LNβ occupies the angular range from the angular position θ1° to the angular position θ2°, the duration of the application of the attractive force Fβ to the sensitive portion T is longer than that of the application of the attractive force Fα to the sensitive portion T. Therefore, the peak Pwβ of the attractive force Fβ is lower than the peak Pwα of the attractive force Fα.

Figure 13:
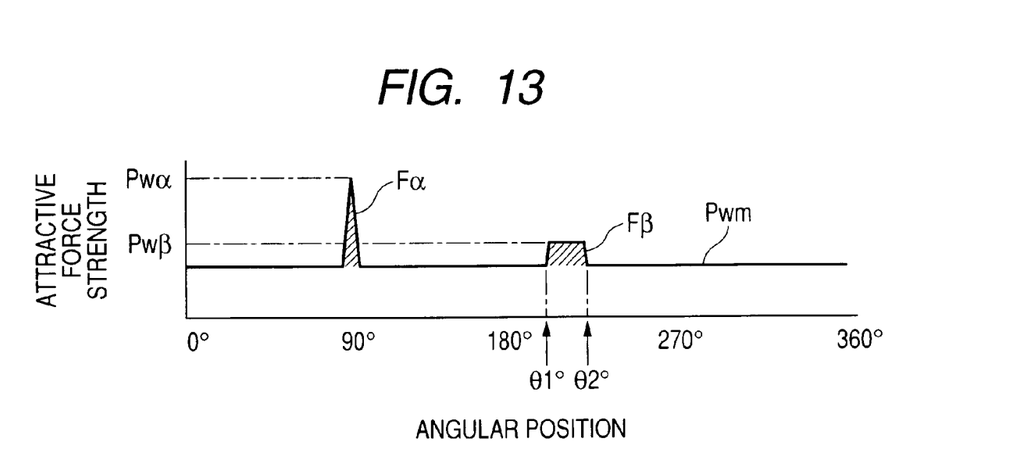
FIG. 13 is a diagram showing the relation between the angular position of the highly magnetically-sensitive portion of the rotor yoke relative to the bias magnet and the strength of an attractive force exerted on the highly magnetically-sensitive portion of the rotor yoke by the bias magnet in FIG. 12 which occurs during the rotation of a rotor.

In FIG. 13, the character "Pwm" denotes a level of the attractive force caused by the bias magnet 18Z except the inter-pole boundaries LNα and LNβ. The area of the sharp triangular pulse of the attractive force Fα above the level Pwm is substantially equal to that of the trapezoidal pulse of the attractive force Fβ above the level Pwm. Thus, the peak Pwβ of the attractive force Fβ decreases as the angular range occupied by the inter-pole boundary LNβ (that is, the angular range from the angular position θ1° to the angular position θ2°) increases. Accordingly, the peak Pwβ decreases as the eccentricity quantity A4 (see FIG. 12) increases. A decrease in the peak Pwβ corresponds to a smaller pulse-like increase in the attractive force which is exerted on the sensitive portion T in synchronism with the rotation of the rotor R. Therefore, as the peak Pwβ decreases, it is possible to more effectively suppress undesired vibration (thrust-direction vibration) of the motor 50 which might be caused by a pulse-like increase in the attractive force exerted on the sensitive portion T.

Each of the previously-mentioned prescribed magnetization patterns P1-P7 has at least two inter-pole boundaries which extend on a straight line or lines out of the center C of the ring of the bias magnet 18 and deviating from radial directions with respect to the ring. Thus, each of the prescribed magnetization patterns P1-P7 has a smaller chance of causing undesired vibration of the motor 50. As the number of inter-pole boundaries which extend on a straight line or lines out of the center C of the ring of the bias magnet 18 and deviating from radial directions with respect to the ring is greater, there is a less chance of causing undesired vibration of the motor 50. In this regard, the prescribed magnetization patterns P1, P3, and P4 (the patterns in FIGS. 1, 4, and 5) are most preferable since all the inter-pole boundaries in these patterns extend on straight lines out of the center C of the ring and deviating from radial directions with respect to the ring.

In the case where a weak edgewise pressure to the spindle 4 suffices, it is preferable that the degree of unbalance of the attractive force by the bias magnet 18 in the circumferential direction is small. In this case, the magnetization pattern of the bias magnet 18 may be such that at least one of inter-pole boundaries extends on a straight line out of the center of the magnet ring and deviating from a radial direction with respect to the magnet ring.

With respect to the low-cost manufacture or the easy manufacture of the motor 50, the prescribed magnetization patterns P1, P2, and P3 (the patterns in FIGS. 2, 3, and 4) are preferable.

A method of manufacturing the motor 50 has the previously-mentioned magnetizing step and a sequence of assembling steps. The sequence of the assembling steps follows the magnetizing step. The sequence of the assembling steps includes a sequence of first to sixth steps mentioned hereafter.

In the first step, the core 8 with the windings 2 is fitted onto the outer circumferential surface 7b of the bearing holder 7 under pressure.

In a former stage of the second step, the radial bearing 6 is inserted through the circular opening 5a of the motor base 5 from the side opposite to the flange 6a. Before the second step, the sensor (the Hall effect device) 20 is soldered to the motor base 5. In a later stage of the second step, the bearing holder 7 with the core 8 is fitted onto the outer circumferential surface 6b of the radial bearing 6 under pressure so that the flange 7a of the bearing holder 7 will be brought into contact with the motor base 5, and that the motor base 5 will be sandwiched between the flange 7a of the bearing holder 7 and the flange 6a of the radial bearing 6.

In a former stage of the third step, the back yoke 19 is fitted onto the end of the bearing holder 7 which is opposite to the flange 7a. The fitting is implemented under pressure. The back yoke 19 is brought into contact with the step 7b on the bearing holder 7. The contact with the step 7b decides an axial-direction position of the back yoke 19 relative to the bearing holder 7. In a later stage of the third step, the portion of the wall of the bearing holder 7 which extends radially outward of the cut groove 7e is bent or crimped radially outward into engagement with the back yoke 19. Thereby, the back yoke 19 is firmly retained by and fixed to the bearing holder 7. Specifically, the back yoke 19 is firmly held between the step 7d of the bearing holder 7 and the radially-outward-bent portion thereof.

In the fourth step, α-cyanoacrylate adhesive is applied to the top end surface 19a of the back yoke 19 (see FIG. 1). Then, the bias magnet 19 is located around the bearing holder 7 and is placed on the top end surface 19a of the back yoke 19 in a manner such that the bias magnet 19 is coaxial with the rotation axis CL. The bias magnet 19 is fixed to the back yoke 19 by the adhesive. The inside diameter of the bias magnet 18 is set slightly greater than that of the back yoke 19 to prevent the bias magnet 18 from interfering with the radially-outward bent portion of the bearing holder 7 which extends radially outward of the cut groove 7e. It should be noted that the α-cyanoacrylate adhesive may be replaced by UV curing adhesive or anaerobic adhesive.

In the fifth step, the spindle 4 is inserted into the radial bearing 6, and the stop ring 12 is fitted onto the distal end of the spindle 4 under pressure. Before the fifth step, the turn table 17 is connected to the rotor yoke 3, and the base end of the spindle 4 is fitted into the central opening 3c of the rotor yoke 3 under pressure so that the spindle 4 is fixed to the rotor yoke 3. The stop ring 12 prevents the spindle 4 from moving out of the radial bearing 6.

In the sixth step, the thrust cover 9 is fixed to the motor base 5 by the screws 14 while the oil seal 14 is sandwiched between the thrust cover 9 and the motor base 5. Before the sixth step, the thrust plate 10 is connected to the thrust cover 9.

The whole of a raw member for the bias magnet 18 is magnetized. Thus, a non-magnetized region is absent from the bias magnet 18. Accordingly, the bias magnet 18 can generate a strong attractive force. Furthermore, the bias magnet 18 can be small-sized. An inexpensive Nd—Fe—B bond magnet can be used as the bias magnet 18.

SECOND EMBODIMENT

A motor in a second embodiment of this invention is similar to that in the first embodiment thereof except that the bias magnet 18 is fixed to the rotor R rather than the stator S. Specifically, the bias magnet 18 is fixed to, for example, the rotor yoke 3. The core 8 or the back yoke 19 in the stator S is opposed to the bias magnet 18 so that an attractive force will be developed therebetween. Thus, the major part of the rotor R is attracted toward the stator S.

What is claimed is:
1. A motor comprising:
a stator;
a rotor being rotatable relative to the stator and having a rotation axis; and
a bias magnet and a magnetic-material member magnetically interacting with each other and being provided for enabling the stator and the rotor to magnetically attract each other, the bias magnet having a shape of a ring and being coaxial with the rotation axis, the bias magnet having an inner circumference and an outer circumference, the inner circumference and the outer circumference having a common center, the bias magnet and the magnetic-material member being axially opposed to and axially spaced from each other;

wherein the bias magnet has a plurality of N and S poles alternately arranged along a circumferential direction thereof, and at least one of boundaries between the N and S poles extend on a straight line off of the common center as viewed in an axial direction of the bias magnet.

2. A motor as recited in claim 1, further comprising:
an annular drive magnet contained in the rotor; and
an annular core contained in the stator and having projecting pole pieces provided with windings, the drive magnet and the core being radially opposed to and radially spaced from each other.

3. A motor as recited in claim 2, wherein the bias magnet is fixed to the stator, and the rotor includes a cup-shaped rotor yoke fixing the drive magnet with respect to the rotor, and the rotor yoke has a portion forming the magnetic-material member.

4. A motor comprising:
a stator;
a rotor being rotatable relative to the stator and having a rotation axis; and
a bias magnet and a magnetic-material member magnetically interacting with each other and being provided for enabling the stator and the rotor to magnetically attract each other, the bias magnet having a shape of a ring and being coaxial with the rotation axis, the bias magnet having an inner circumference and an outer circumference, the inner circumference and the outer circumference having a common center, the bias magnet and the magnetic-material member being axially opposed to and axially spaced from each other;

wherein the bias magnet has an N pole and an S pole alternately arranged along a circumferential direction thereof, and boundaries between the N and the S poles extend on straight lines which meets at a single point separate from the common center as viewed in an axial direction of the bias magnet.

5. A motor as recited in claim 4, further comprising:
an annular drive magnet contained in the rotor; and
an annular core contained in the stator and having projecting pole pieces provided with windings, the drive magnet and the core being radially opposed to and radially spaced from each other.

6. A motor as recited in claim 5, wherein the bias magnet is fixed to the stator, and the rotor includes a cup-shaped rotor yoke fixing the drive magnet with respect to the rotor, and the rotor yoke has a portion forming the magnetic-material member.

7. A motor comprising:
a stator;
a rotor being rotatable relative to the stator and having a rotation axis; and
a bias magnet and a magnetic-material member magnetically interacting with each other and being provided for enabling the stator and the rotor to magnetically attract each other, the bias magnet having a shape of a ring and being coaxial with the rotation axis, the bias magnet having an inner circumference and an outer circumference, the inner circumference and the outer circumference having a common center, the bias magnet and the magnetic-material member being axially opposed to and axially spaced from each other;

wherein the bias magnet has an N pole and an S pole successively arranged along a circumferential direction thereof, and boundaries between the N pole and the S poles extend on common straight line distant from the common center as viewed in an axial direction of the bias magnet.

8. A motor as recited in claim 7, further comprising:
an annular drive magnet contained in the rotor; and
an annular core contained in the stator and having projecting pole pieces provided with windings, the drive magnet and the core being radially opposed to and radially spaced from each other.

9. A motor as recited in claim 8, wherein the bias magnet is fixed to the stator, and the rotor includes a cup-shaped rotor yoke fixing the drive magnet with respect to the rotor, and the rotor yoke has a portion forming the magnetic-material member.

* * * * *